(12) United States Patent
Turner

(10) Patent No.: US 8,186,650 B2
(45) Date of Patent: May 29, 2012

(54) LINE RETRIEVAL SYSTEM AND METHOD

(75) Inventor: Mark Turner, Arlington, TX (US)

(73) Assignee: Labor Saving Systems, Ltd., Arlington, TX (US)

( * ) Notice: Subject to any disclaimer, the term of this patent is extended or adjusted under 35 U.S.C. 154(b) by 231 days.

(21) Appl. No.: 12/632,683

(22) Filed: Dec. 7, 2009

(65) Prior Publication Data

US 2010/0078611 A1    Apr. 1, 2010

Related U.S. Application Data

(62) Division of application No. 11/209,123, filed on Aug. 22, 2005, now Pat. No. 7,648,122.

(51) Int. Cl.
*H02G 1/08* (2006.01)
*B65H 59/00* (2006.01)
(52) U.S. Cl. .................. 254/134.3 FT; 254/134.3 R
(58) Field of Classification Search ......... 254/134.3 FT, 254/134.3 R; 335/293
See application file for complete search history.

(56) References Cited

U.S. PATENT DOCUMENTS

| | | | |
|---|---|---|---|
| 2,507,559 A | 5/1950 | D'Andrea | |
| 2,522,815 A | 9/1950 | Early | |
| 2,812,921 A | 11/1957 | Leith | |
| 2,970,003 A | 1/1961 | Heath et al. | |
| 2,971,381 A | 2/1961 | Tesi | |
| 2,973,107 A | 2/1961 | Cherel | |
| 3,317,872 A | 5/1967 | Wullkopf | |
| 3,614,181 A | 10/1971 | Meeks | |
| 3,997,272 A | 12/1976 | George | |
| 4,072,370 A | 2/1978 | Wasson | |
| 4,076,242 A | 2/1978 | Joseph | |
| 4,527,775 A | 7/1985 | Flowers | |
| 4,614,930 A * | 9/1986 | Hickey et al. | ................. 335/302 |
| 4,990,306 A | 2/1991 | Ohashi | |
| 5,399,311 A | 3/1995 | Kasai et al. | |
| 5,988,109 A | 11/1999 | Rofen | |
| 6,206,978 B1 | 3/2001 | Tsui | |
| 6,348,104 B1 | 2/2002 | Bakker | |
| 6,542,078 B2 | 4/2003 | Script et al. | |
| 6,634,052 B2 | 10/2003 | Hanson | |
| 6,749,480 B1 | 6/2004 | Hunts | |
| 6,857,382 B2 | 2/2005 | Perkins | |
| 7,051,999 B2 | 5/2006 | Hewitt | |

(Continued)

FOREIGN PATENT DOCUMENTS

CA    850334    9/1970

(Continued)

OTHER PUBLICATIONS

Hayashi, Y. et al.; Development of a DC Brush Motor with 50% Weight and Volume Reduction Using an Nd-Fe-B Anisotropic Bonded Magnet; IEEE Transactions on Magnets; vol. 39; No. 5: pp. 2893-2895; Sep. 2003.

(Continued)

*Primary Examiner* — Lee D Wilson
*Assistant Examiner* — Jamal Daniel
(74) *Attorney, Agent, or Firm* — James L. Baudino

(57) ABSTRACT

A line retrieval system comprises a retrieval device having a radially magnetized magnet adapted to be magnetically coupled to an object disposed on an opposite side of a structure for drawing the object in a desired direction relative to the structure.

6 Claims, 4 Drawing Sheets

U.S. PATENT DOCUMENTS

| | | |
|---|---|---|
| 7,093,822 B2 | 8/2006 | Welker |
| 2002/0097121 A1 | 7/2002 | Leupold |
| 2003/0213943 A1 | 11/2003 | Turner |

FOREIGN PATENT DOCUMENTS

| | | |
|---|---|---|
| CN | 2469592 | 1/2002 |

OTHER PUBLICATIONS

Campbell, Peter; Permanent Magnet Materials and their Application; Cambridge University Press; p. 167; 1994.

Falconer, Ian et al.; Physics 1—Electricity; The University of Sydney; Eleventh Edition; pp. ii-iv and 72-82; 1982.

Chikazumi, Soshin et al.; Physics of Ferromagnetism; Oxford University Press; p. 23; 1997.

Welker Wall Snake, Magnetic Wire-Pulling System, Internet website, May 3, 2005 (http://web.archive.org/web/20050503190807/http://www.wallsnake.com).

Welker Wall Snake, Magnetic Wire-Pulling System, Internet website brochure, May 3, 2005 (http://web.archive.org/web/20050503190807/www.wallsnake.com/wallsnake.pdf).

BES, Fiberfish, Internet website, Aug. 11, 2003 (http://web.archive.org/web/20030801181520/www.fiberfish.com/fiberfish.htm).

Creep-Zit, Internet website, Aug. 18, 2001 (http://web.archive.org/web/20010818200811/http://lsdinc.com/toolswire2.htm#creep).

Creep-Zit Details, Internet website, Aug. 30, 2004 (http://web.archive.org/web/20040830162020/www.lsdinc.com/cgi-local/loadpage.cgi?user_id=4503785&file=creepzit.html).

Moskowitz, Lester R., Permanent Magnet Design and Application Handbook, 1976, Chapter 16, pp. 260 and 265.

Hadfield, D., Permanent Magnets and Magnetism, 1962, pp. 357 and 358.

Yonnet, Jean-Paul, Calculation of Permanent Magnet Couplings, Proceedings of the Twelfth International Workshop on Rare-Earth Magnets and Their Applications, 1992, Session 8, pp. 608 and 612-614.

Hennig, Gerhard R., Magnets are Everywhere, 1994, pp. 125, 126 and 138.

Yeadon, William H., et al., Handbook of Small Electric Motors, 2001, Chapter/p. 5.49.

Jang, Seok-Myeong, Design and Analysis of High Speed Slotless PM Machine with Halbach Array, IEEE Transactions on Magnetics, vol. 37, No. 4, Jul. 2001, pp. 2827-2830.

Bowditch, Nathaniel, Magnetic Compass Adjustment, The American Practical Navigator, 1995, Chapter 6, pp. 81-112.

European Search Report as issued in Application No. 06802189.8; Jul. 19, 2011.

* cited by examiner

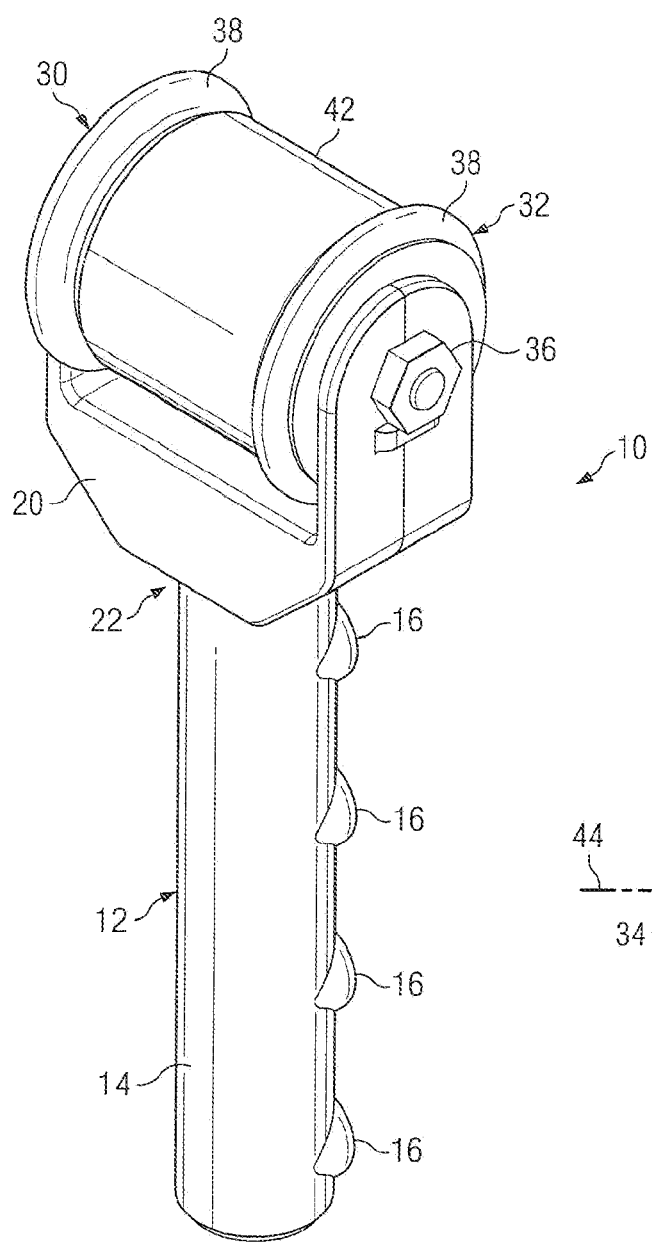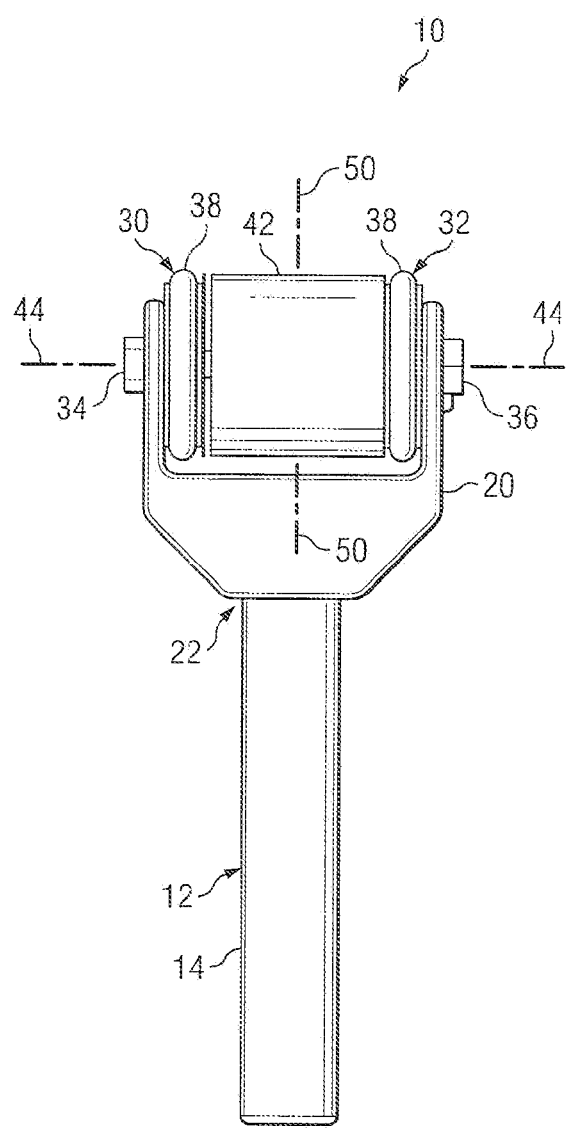
FIG. 1
FIG. 2A

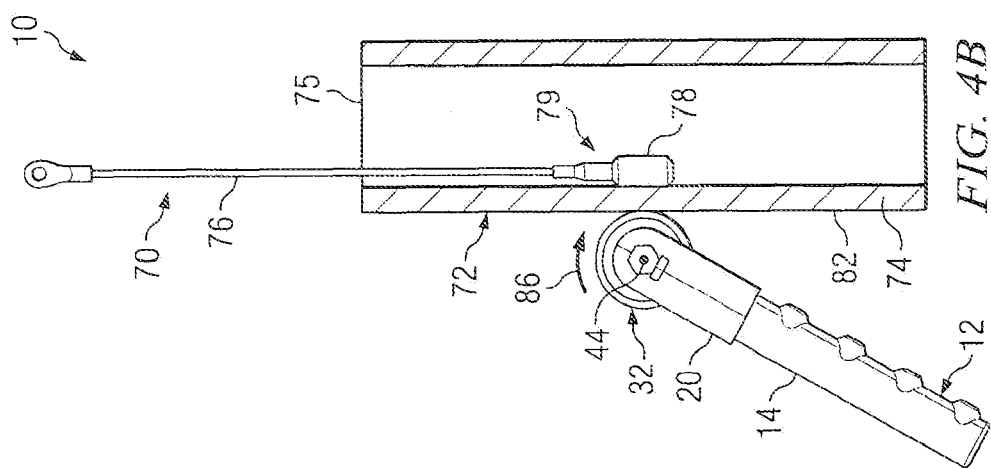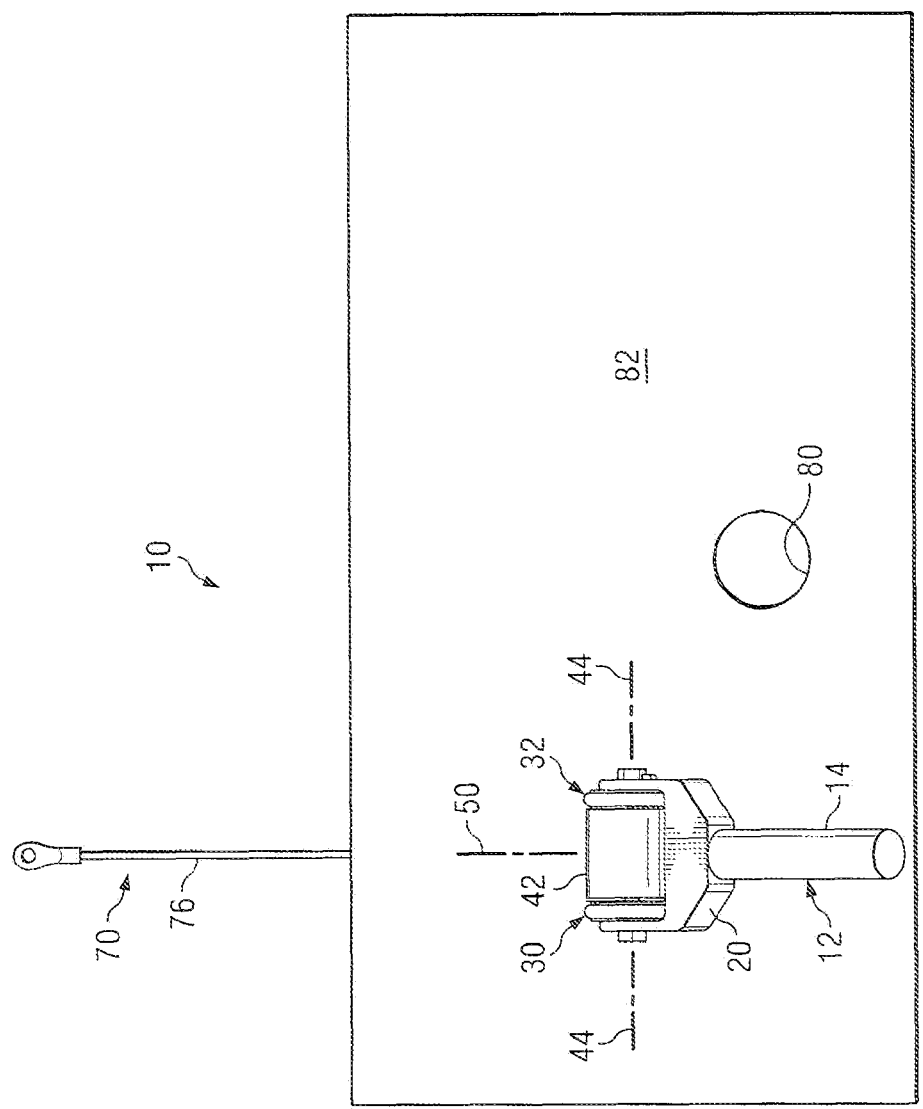

LINE RETRIEVAL SYSTEM AND METHOD

RELATED APPLICATIONS

This application is a divisional of U.S. patent application Ser. No. 11/209,123, filed Aug. 22, 2005, now U.S. Pat. No. 7,648,122 entitled "LINE RETRIEVAL SYSTEM AND METHOD", which is hereby incorporated by reference herein.

BACKGROUND OF THE INVENTION

In the past, the most commonly used method of locating and/or drawing a wire or line within a wall or behind any other type of structure involved cutting a small hole in a portion of the structure, inserting a hooked rod through the hole, and attempting to snare and retrieve the line through the hole. This method involves considerable guesswork and error and is not easy to do even for an experienced technician.

BRIEF DESCRIPTION OF THE DRAWINGS

FIG. 1 is a diagram illustrating a perspective view of an embodiment of a line retrieval system in accordance with the present invention;

FIG. 2A is a diagram illustrating a plan view of the line retrieval system illustrated in FIG. 1;

FIG. 4A is a diagram illustrating a plan view of the line retrieval system illustrated in FIGS. 1-3 relative to an enclosure;

FIG. 4B is a diagram illustrating a side view of the line retrieval system illustrated in FIG. 4A relative to an enclosure;

DETAILED DESCRIPTION OF THE DRAWINGS

Figure 2B:
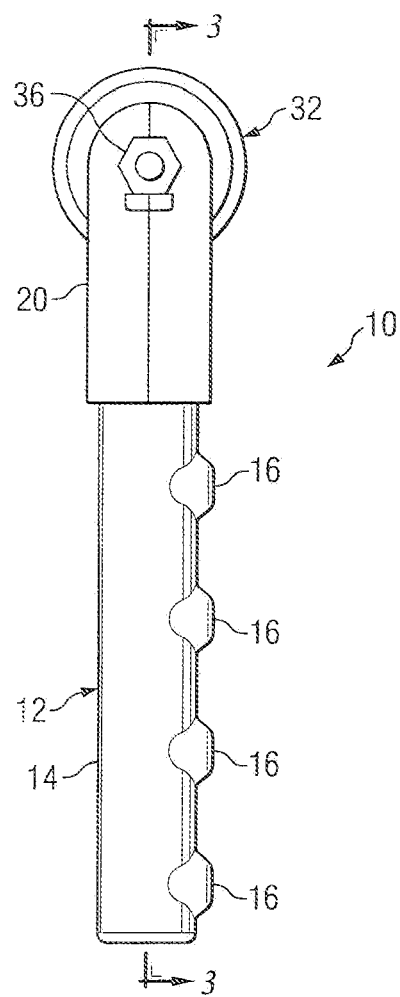
FIG. 2B is a diagram illustrating a side view of the line retrieval system illustrated in FIGS. 1 and 2A.
Figure 2C:
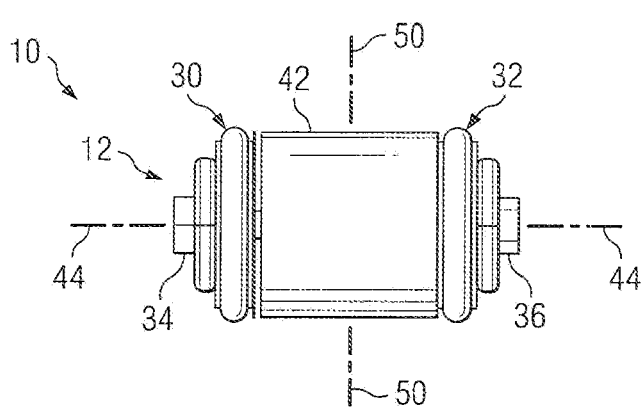
FIG. 2C is a diagram illustrating a top view of the line retrieval system illustrated in FIGS. 1, 2A and 2B.
Figure 3:
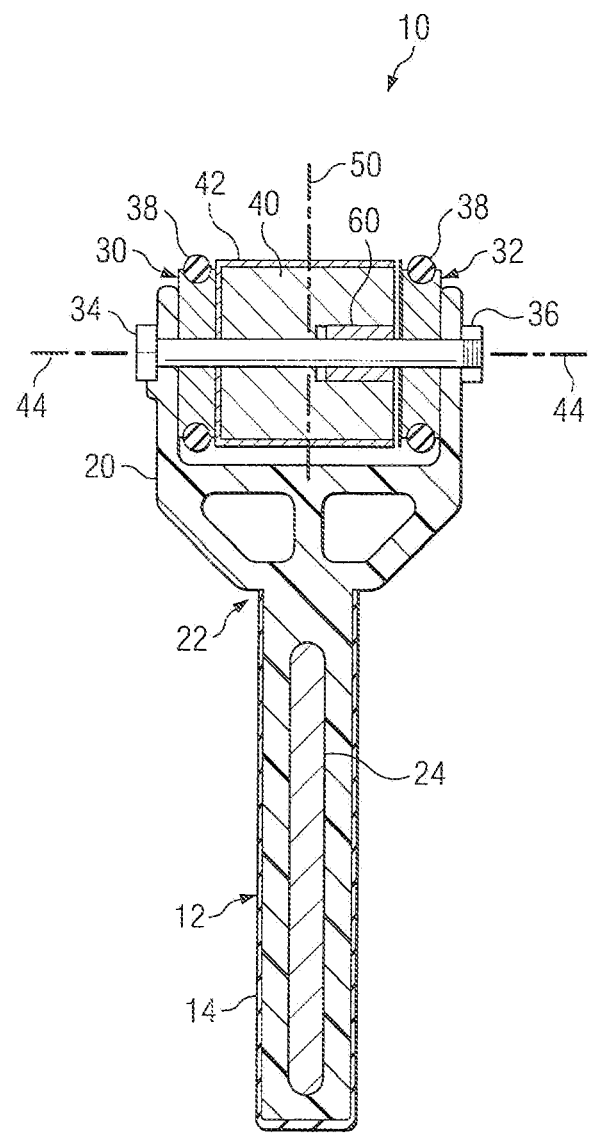
FIG. 3 is a diagram illustrating a section view of the line retrieval system illustrated in FIGS. 1 and 2A-2C taken along the line 3-3 of FIG. 2B.

FIGS. 1 through 5 are diagrams illustrating a line retrieval system 10 in accordance with one embodiment of the present invention. As best illustrated in FIGS. 1-3, system 10 comprises a line retrieval device 12 having a handle 14 to enable grasping and/or manipulating thereof by a user of device 12. In the embodiment illustrated in FIGS. 1-3, handle 14 is configured having protrusions 16 to facilitate gripping and/or handling of retrieval device 12. However, it should be understood that retrieval device 12 may be configured without protrusions 16.

In the embodiment illustrated in FIGS. 1-3, retrieval device 12 comprises a yoke 20 disposed at an end 22 of handle 14. As best illustrated in FIG. 3, handle 14 and yoke 20 are preferably configured as being integral with one another (e.g., formed as a single and/or unitary member). However, it should be understood that retrieval device 12 may be otherwise configured (e.g., yoke 20 configured being couplable to end 22 of handle 14 using fasteners, threaded engagement, etc.). In the embodiment illustrated in FIGS. 1-3, retrieval device 12 is configured from a lightweight plastic or polymer material having a weighted insert 24 disposed within handle 14. However, it should be understood that retrieval device 12 may be otherwise configured.

In the embodiment illustrated in FIGS. 1-3, retrieval device 12 comprises rollers 30 and 32 rotatable coupled to yoke 20 via a bolt 34 and nut 36 arrangement. However, it should be understood that rollers 30 and 32 may be otherwise rotatably coupled to yoke 20. Further, in the embodiment illustrated FIGS. 1-3, two rollers 30 and 32 are illustrated. However, it should be understood that retrieval device 12 may be configured having a greater or lesser quantity of rollers. In the embodiment illustrated in FIGS. 1-3, rollers 30 and 32 each comprise an elastomer member 38 to facilitate a desired level of friction between rollers 30 and 32 and a surface against which rollers 30 and 32 are placed to facilitate rotational movement of rollers 30 and 32 and to, preferably, avoid sliding of rollers 30 and 32 along such surface, thereby avoiding or preventing possible damage to such surface. However, it should be understood that rollers 30 and 32 may be otherwise configured.

In the embodiment illustrated in FIGS. 1-3, retrieval device 12 comprises a magnet 40 rotatably coupled to yoke 20 via bolt 34. In the embodiment illustrated in FIGS. 1-3, magnet 40 is configured having a cylindrical shape. However, it should be understood that magnet 40 may be otherwise geometrically configured. In the embodiment illustrated in FIGS. 1-3, magnet 40 is disposed within a rotatable sleeve 42. Sleeve 42 is configured as being rotatable to facilitate rotation thereof relative to a surface against which device 12 is placed in response to, for example, an imperfection, irregularity or other type of condition on such surface. Sleeve 42 further facilitates movement or rolling of device 12 over a surface against which device 12 is placed when such surface comprises a non-hard surface, such as a carpet, where, for example, rollers 30 and 32 may be prevented from adequately engaging such surface to enable rotational movement of rollers 30 and 32. Sleeve 42 also protects magnet 40 disposed therein. Preferably, sleeve 42, magnet 40 and rollers 30 and 32 are configured to rotate independently relative to each other about an axis 44 defined by bolt 44. For example, by having at least rollers 30 and 32 independently rotatable, device 12 may be easily turned or otherwise maneuvered relative to a surface against which device 12 is placed. Further, in some embodiments of the present invention, sleeve 42 and, correspondingly, magnet 40, are disposed set back a predetermined distance from an outer periphery or circumference of rollers 30 and 32 to facilitate independent rotation of sleeve 42 and/or magnet 40 relative to rollers 30 and 32 when device is placed against a surface. However, the dimensional and/or rotational characteristics of sleeve 42, magnet 40 and rollers 30 and 32 may be otherwise configured.

In the embodiment illustrated in FIGS. 1-3, magnet 40 is radially magnetized such that the poles of magnet 40 (e.g., an axis formed by the north and south poles of magnet 40 indicated generally by arrow 50) are disposed substantially perpendicular to axis 44. Thus, in the embodiment illustrated in FIGS. 1-3, magnet 40 is radially magnetized to facilitate rotation of magnet about axis 44 in response to a magnetic field disposed proximate thereto. In the embodiment illustrated in FIGS. 1-3, retrieval device 12 also comprises a clutch mechanism 60 coupled to magnet 40 to maintain unidirectional rotation of magnet 40 about axis 44. However, it should be understood that other devices or methods may be used to maintain unidirectional rotation of magnet 40 relative to retrieval device 12.

Figure 4C:
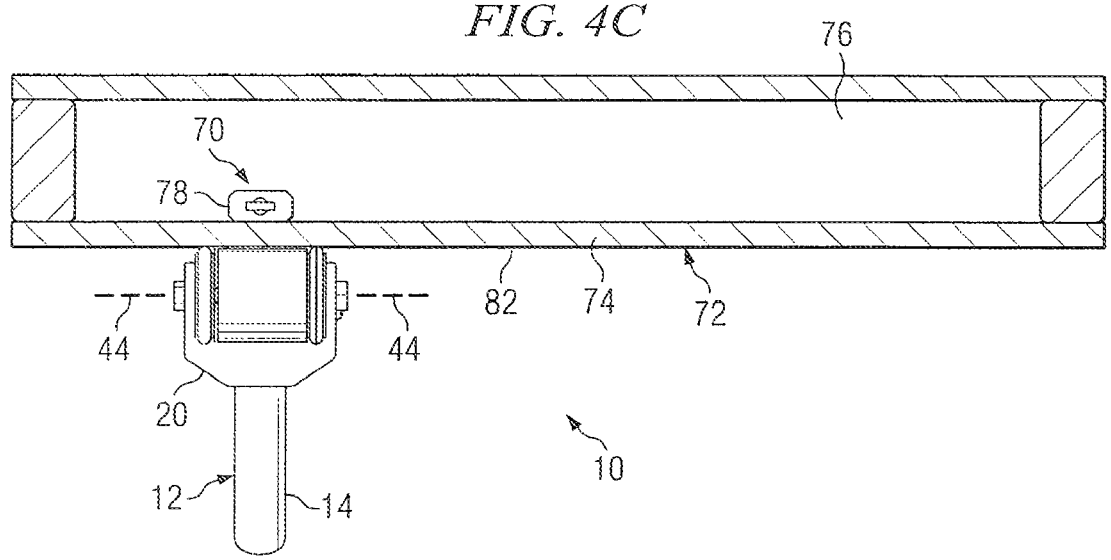
FIG. 4C is a diagram illustrating a top view of the line retrieval system illustrated in FIG. 4A relative to an enclosure.

FIGS. 4A-C are diagrams illustrating a plan view, bide view, and top view, respectively, of system 10 in accordance with the present invention. In operation, retrieval device 12 is used to locate, draw and/or retrieve an object 70 located on an opposite side of a structure 72 relative to retrieval device 12. For example, in the embodiment illustrated in FIGS. 4A-4C, structure 72 comprises a wall 74 of an enclosure 75 (e.g., such as a wall of a structure having an open interior space). In the embodiment illustrated in FIGS. 4A-4C, object 70 comprises a line 76 which may comprise, or may be coupled to, a telephone line, optical or coaxial cable, electric wire, or other type of cable, wire, conduit or other structure of which retrieval is desired. Preferably, object 70 comprises a magnet 78 coupled to an end 79 of line 76 for magnetically coupling with magnet 40 (FIG. 3) of device 12. However, it should be understood that any type of object generally attracted to and/or otherwise affected by magnetic fields may be coupled to and/or otherwise form a part of object 70. Further, as best illustrated in FIG. 4A, a hole or other type of opening 80 may be formed in structure 72 (e.g., within wall 74 of enclosure 75) to facilitate retrieval of object 70 therethrough.

In operation, a technician or other user disposes retrieval device 12 in close proximity to and/or in contact with a surface 82 of structure 72. Magnet 40 (FIG. 3) rotates about axis 44 relative to yoke 20 in the direction indicated by arrow 86 to magnetically couple to object 70 (e.g., magnet 78). For example, as discussed above, magnet 40 is configured to rotate about axis 44 relative to yoke 20 to facilitate magnetic coupling of magnet 40 to magnet 78 regardless of which pole of magnet 78 is disposed facing towards retrieval device 12. For example, because magnet 40 is rotatable about axis 44, and because magnet 40 is radially magnetized, magnet 40 rotates relative to yoke 20 in response to a pole of magnet 78 disposed facing retrieval device 12. Once magnet 40 is magnetically coupled to object 70 (e.g., magnet 78), retrieval device 12 may be moved and/or otherwise rolled along surface 82 of structure 72 (e.g., via rollers 30 and 32) toward opening 80, thereby drawing object 70 toward opening 80 to facilitate retrieval of object 70 through opening 80. Further, insert 24 facilitates vertical downward movement of device 12 relative to structure 72. For example, after object 70 and magnet 40 are magnetically coupled, a user may release device 12 and feed object 70 downwardly within enclosure 75 such that as object 70 moves downwardly within enclosure 75, insert 24 maintains generally vertical movement of device 12 relative to enclosure 75.

Embodiments of the present invention also provide enhanced magnetic coupling of retrieval device 12 with object 70. For example, as described above, in some embodiments of the present invention, retrieval device 12 comprises a clutch mechanism 60 to maintain unidirectional rotation of magnet 40 about axis 44. Referring to FIG. 4B, clutch mechanism 60 maintains rotation of magnet 40 only in the direction indicated by arrow 86 about axis 44 such that, in response to rolling movement of retrieval device 12 relative to structure 72, a pole of magnet 40 magnetically coupled to magnet 78 maintains a position generally perpendicular to surface 82 of structure 72, thereby maintaining a greater magnetic coupling of magnet 40 to magnet 78.

Figure 5:
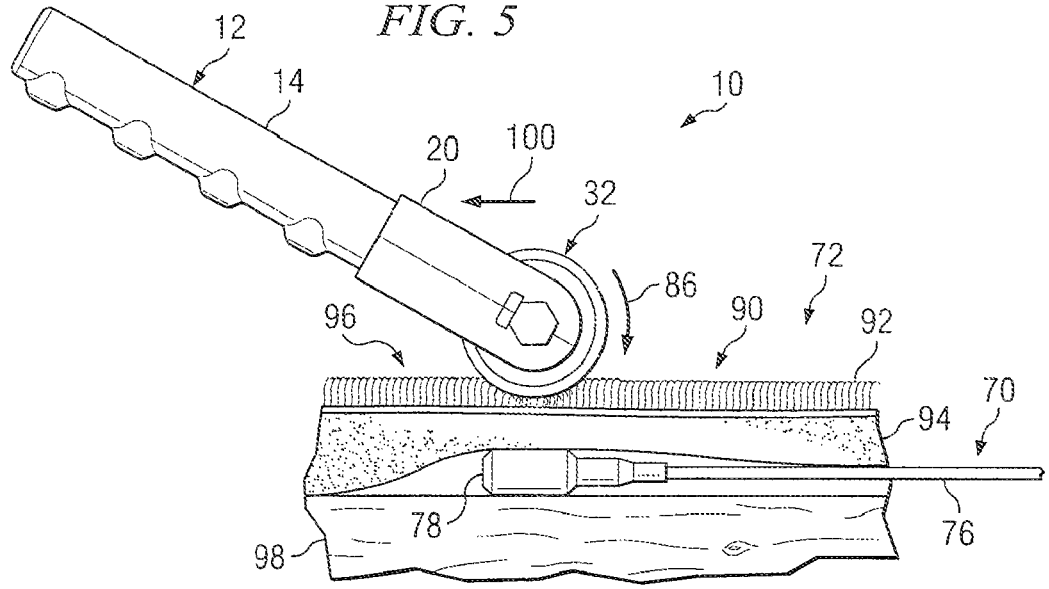
FIG. 5 is a diagram illustrating a plan view of the line retrieval system illustrated in FIGS. 1-3 relative to floor covering.

FIG. 5 is a diagram illustrating operation of system 10 where structure 72 comprises a floor covering 90 (e.g., a carpet 92 and carpet padding 94). As described above, device 12 is disposed in close proximity to and/or in contact with a surface 96 of floor covering 90. In the embodiment illustrated in FIG. 5, object 70 (e.g., line 76 and magnet 78) are disposed between floor covering 90 and an underlying structure 98. In response to the magnetic field generated by magnet 78 (e.g., depending on the pole of magnet 78 facing device 12), magnet 40 (FIG. 3) rotates, as needed, relative to device 12 to rotatably couple to magnet 78 (e.g., to align a pole of magnet 40 attracted to a corresponding pole of magnet 78 facing device 12). In the embodiment illustrated in FIG. 5, device 12 may then be rolled along surface 96 of floor covering 90 (e.g., via rollers 30 and 32) in the direction indicated generally by arrow 100 to draw object 70 in the direction 100 relative to floor covering 90.

Further, as described above, clutch mechanism 60 (FIG. 3) maintains unidirectional rotation of magnet 40 relative to device 12 in the direction indicated by 86 such that, in response to movement of device 12 in the direction 100, magnet 40 is prevented from rotating in a direction opposite direction 86 which may otherwise result from rolling of device 12 in the direction 100, thereby enhancing the magnetic coupling of magnet 40 to magnet 78. Therefore, as a result of maintaining unidirectional rotation of magnet 40 relative to device 12, a pole of magnet 40 magnetically attracted to a corresponding pole of magnet 78 is maintained in a substantially perpendicular relationship relative to surface 96 of structure 70 and in substantial axial alignment with the pole of magnet 78 facing magnet 40. Accordingly, embodiments of the present invention maintain an enhanced magnetic coupling between magnet 40 and magnet 78 by maintaining magnet 40 in a position relative to magnet 78 where the magnetic forces coupling magnets 40 and 78 are greatest (e.g., directionally aligned with each other). Additionally, sleeve 42 enables easier and/or smoother movement of device 12 over and/or relative to structure 72 (e.g., floor covering 90). For example, sleeve 42 is adapted to rotate relative to device 12, thereby reducing an amount of friction between device 12 and structure 72 (e.g., floor covering 90) that may be otherwise present resulting from contact between device 12 and structure 72 (e.g., resulting especially from different types or heights of carpet or other types of floor coverings).

What is claimed is:

1. A line retrieval system, comprising:
    means for drawing an object disposed on an opposite side of a structure in a desired direction relative to the structure, the drawing means comprising a radially magnetized means for magnetically coupling to the object through the structure; and
    means for maintaining unidirectional rotational movement of the radially magnetized means relative to the drawing means.

2. The system of claim 1, further comprising means for enabling rolling of the drawing means along the structure.

3. The system of claim 1, wherein the radially magnetized means comprises a cylindrically-configured radially magnetized means.

4. The system of claim 1, wherein the radially magnetized means is disposed within a rotatable means.

5. The system of claim 4, wherein the rotatable means and the radially magnetized means are rotatable independently of each other.

6. The system of claim 4, wherein the drawing means comprises means for enabling rolling of the drawing means along the structure, and wherein the rolling means, the rotatable means and the radially magnetized means are rotatable independently of each other.

* * * * *